Dec. 14, 1948.    C. B. SOHNS    2,456,030
ELECTRIC SOLDERING IRON
Filed Dec. 5, 1945
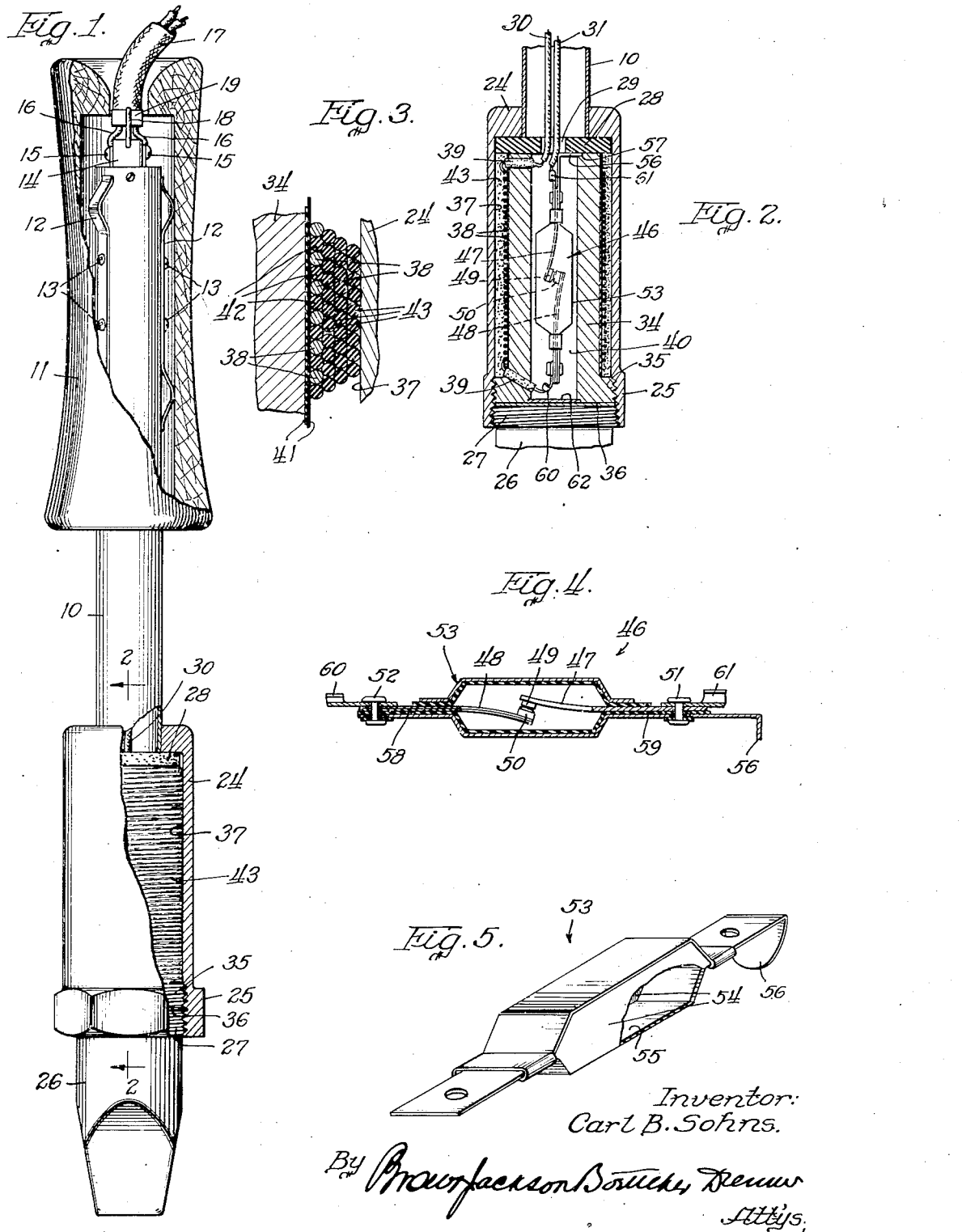
Inventor:
Carl B. Sohns.

Patented Dec. 14, 1948

2,456,030

UNITED STATES PATENT OFFICE 2,456,030

ELECTRIC SOLDERING IRON

Carl B. Sohns, Grafton, Wis.

Application December 5, 1945, Serial No. 632,925

2 Claims. (Cl. 219—26)

My invention relates, generally, to electric soldering irons, and it has particular relation to soldering irons in which the temperature of the soldering tip is automatically controlled.

In the electric soldering irons of the prior art it has generally been the case that no means is provided for controlling the temperature of the soldering tip. That is, in many instances a heating element is provided for the soldering tip which is continuously energized. The result is that the tip may become overheated if the iron is allowed to stand without use, or it may be underheated as the result of continuous use.

There have been some attempts made at automatically controlling the temperature of the soldering tip. However, in so far as I am aware, in such soldering irons the temperature responsive element has been located at a point remote from the soldering tip so that it is affected by the outer shell temperature or by the temperature of the core at the end remote from the soldering tip.

It is, therefore, an object of my invention, generally stated, to provide an automatically controlled electric soldering iron which shall have a relatively long life, shall be of relatively light weight, and which may be readily and economically manufactured and used.

Another object is to employ directly the heat of the soldering tip for automatically controlling its temperature.

Still another object is to position the automatic tip temperature control means adjacent the tip so as to obtain maximum sensitivity to temperature change.

A further object is to so arrange, construct and mount the automatic temperature control as to render the same relatively insensitive to mechanical shocks resulting from rough handling, falling and the like.

Another object is to provide relatively high heat transfer between the heating element and the soldering tip and relatively low heat transfer between the heating element and the parts supporting the tip.

Other objects of my invention will, in part, be obvious and in part appear hereinafter.

My invention, accordingly, is disclosed in the embodiment thereof shown in the accompanying drawing, and it comprises the features of construction, combination of elements, and arrangement of parts, which will be exemplified in the construction hereinafter set forth and the scope of the application of which will be indicated in the appended claims.

For a more complete understanding of the nature and scope of my invention, reference may be had to the following detailed description, taken in connection with the accompanying drawing, in which:

Figure 1 is a view, partly in side elevation and partly in section, showing an electric soldering iron in which the present invention is incorporated;

Figure 2 is a detail sectional view taken along the line 2—2 of Figure 1;

Figure 3 is a detail sectional view, at an enlarged scale, showing the arrangement of the resistance element and the insulation therefor with respect to the core;

Figure 4 is a view, in side elevation, of the automatic temperature control means, the enclosure being broken away to show the interior construction; and Figure 5 is a perspective view of the support for the automatic control means before the same has been formed into position about the contacts and the support thereof.

Referring now particularly to Figure 1 of the drawing, it will be observed that the reference character 10 designates a support tube which forms the principal frame for the soldering iron. At one end there is provided a conventional wood handle 11 which may be frictionally held in place by leaf springs 12 secured to the tube 10 by screws 13. In the upper end of the tube 10 there is provided a phenol fiber block 14 which receives terminal screws 15 to which conductors 16 of a conventional flexible conductor cable 17 may be attached. There is provided a staycord 18 which mechanically interconnects a metal band 19 and the block 14 for the purpose of taking mechanical stress off of the conductors 16.

At the lower end of the tube 10 there is provided a metallic shell 24 which may be secured to the tube with a press fit. Preferably the lower end of the shell 24 is hexagonal in shape, as indicated at 25, to facilitate the application of a wrench thereto. It will be noted that the lower internal end of the shell 24 is threaded and that a soldering tip 26, having threads 27, is screwed into the same.

As shown more clearly in Figure 2 of the drawing, an asbestos washer 28 is located at the upper end of the cavity in the shell 24. The washer 28 has a centrally located aperture 29 through which conductors 30 and 31 extend. It will be understood that the conductors 30 and 31 extend through the tube 10 and are connected to the terminal screws 15.

Within the shell 24 and abutting the asbestos washer 28 is a hollow copper core 34, the lower end 35 of which is externally threaded and, as shown, is screwed into the lower threaded end of the shell 24. The abutting faces of the tip 26 and core 34, as indicated at 36, are preferably electroplated with silver, for example, in order to insure intimate contact engagement therebetween. The purpose of this is to provide maximum conductivity between the core 34 and the tip 26 for obvious reasons.

The body portion of the core 34 is spaced from the internal surface of the shell 24 so as to provide an annular space 37 therebetween. In this space 37 there is wound a coil 38 of resistance wire, such as Nichrome wire, or other suitable resistance wire. The end portions of the coil or heating element 38 extend through ceramic grommets 39 into the space 40 within the core 34. The upper end portion of the resistance element 38 is connected directly to the conductor 30, as shown. The lower end portion is connected to the conductor 31 through automatic temperature control means which will be described presently.

It is desirable to have a minimum of heat transfer from the heating element 38 to the shell 24, and a maximum of heat transfer from the heating element 38 to the core 34. The insulation for the heating element 38, as shown in Figure 3, is so arranged as to accomplish this end. Two thicknesses of insulation 41, such as mica sheet having a thickness of one to two mils, are wound directly on the core 34. The resistance element 38 is then wound around this insulation and thus is placed in close proximity to the core 34. The adjacent turns of the heating element 38 are spaced apart by turns of a suitable insulating cord 42, such as fiber glass cord. Surrounding the composite turns 38 and 42 are several layers of insulating cord 43 which may also be of fiber glass. Substantially more insulation is provided between the heating element 38 and the shell 24 than is provided between the heating element 38 and the core 34. As a result, heat flow to the core 34 is increased while heat flow to the shell 24 is minimized.

The energization of the heating element 38, and thereby the temperature of the soldering tip 26, is controlled by means of an automatic temperature control means, shown generally at 46 and positioned, as shown, in the central opening 40 in the core 34. The details of construction of the control means 46 are shown more clearly in Figure 4 of the drawing.

It will be observed that leaf springs 47 and 48 are provided which carry at their adjacent ends contacts 49 and 50 which may be of silver or which may have silver contact engaging surfaces. The leaf spring 48 constitutes a thermoresponsive element and is formed of bimetal for this purpose. As shown in Figure 2, it is located in close proximity to the tip 26 and thus is directly responsive to the temperature thereof. When the temperature is below a predetermined temperature, the position of the leaf springs 47 and 48 is as shown in Figures 2 and 4 of the drawing, with the contacts 49 and 50 in engagement. However, when the temperature exceeds the predetermined temperature, the bimetal leaf spring 48 deflects and separates the contact 50 from the contact 49. It will be understood that this interrupts the energizing circuit for the heating element 38 and, consequently, the heat applied thereby to the soldering tip 26 is reduced to zero. As soon as the temperature is reduced sufficiently, the bimetal leaf spring 48 deflects in the opposite direction and causes contact 50 to engage contact 49. The energizing circuit is again completed, as will be readily understood.

The leaf springs 47 and 48 are secured by rivets 51 and 52 to a metallic support member, shown generally at 53. As shown in Figure 5 of the drawing, the support member 53 is formed of sheet-like metal and initially has upstanding and depending lips 54 and 55 which, after assembly of the leaf springs 47 and 48 thereon, are folded over to provide a complete enclosure for the contacts 49 and 50 as shown in Figure 4. There is provided an integrally formed tab 56 which fits into a recess 57, Figure 2, in the core 34 to facilitate assembly of the automatic control means 46 therein. The spring strips 47 and 48 are insulated from the metallic support 53 by strips 58 and 59 of mica or other suitable insulating material. Terminal lugs 60 and 61 are also secured to the rivets 52 and 51. The lug 60 is connected to the lower end portion of the heating element 38 while the lug 61 is connected to the conductor 31 as shown in Figure 2.

The lower end of the cavity 40 in the core 34 may be closed by a disc 62, such as a copper disc. Preferably the disc 62 has a press fit with the core 34. The operating temperature range of the soldering iron disclosed herein is determined by the kind and thickness of the metal used for the support 53, the length, thickness, and method of mounting the bimetal leaf spring 48, the proportions of the shell 24 and the core 34, and the areas of the radiating surfaces. Thus in a 500 watt iron of the character herein disclosed, the heating element 38 may be energized and deenergized approximately 50 times per hour to maintain the temperature of the soldering tip 26 within a range of plus or minus ten degrees F. with respect to the desired predetermined temperature. With such relatively infrequent making and breaking of the heating circuit, relatively long life of the silver contacts 49 and 50 may be obtained.

The spring leaf 47 and bimetal spring leaf 48 are relatively thin and short, and are rigidly mounted. Because of this construction and their relatively low inertia, the calibration of the automatic heat control means 46 is substantially permanent and it is particularly resistant to mechanical shock. Tests have shown that an electric soldering iron of the construction herein set forth can be dropped from a height of about six feet with no apparent damage to its operating characteristics.

Since certain changes may be made in the foregoing construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. An electric soldering iron comprising, in combination, support means, a handle at one end thereof adapted to be gripped manually, a soldering tip at the other end, a generally cylindrical heating element carried by said support means in heat conducting relation to said tip, automatic temperature control means disposed within said cylindrical heating element in such position as to be affected directly by the heat of said tip and arranged to control the energization of said heating element so as to maintain the tip substantially at a predetermined temperature, and means for resiliently mounting said automatic temperature control means within said heating element whereby said control means is substantially unaffected by shock resulting from rough handling of the soldering iron.

2. In an electric soldering iron, in combination, a hollow cylindrical metallic core, a soldering tip extending from one end of said core, a metallic shell surrounding said core and providing an annular space therebetween, an electric heating element in said annular space, automatic temperature control means disposed within said hollow core and arranged to control the energization of said heating element so as to maintain said tip substantially at a predetermined temperature; said automatic temperature control means including a metallic support member extending longitudinally of said core, a pair of leaf spring members extending from the ends of said support member toward each other, a contact carried by each spring member at the juxtaposed ends thereof and when in engagement completing an energizing circuit for said heating element, one of said leaf spring members comprising a bimetallic member whereby it is movable in accordance with the temperature thereof to open and close said contacts; and means for mounting said metallic support member from one end so that the same extends in cantilever fashion through said core whereby said leaf spring members and contacts carried thereby are substantially unaffected by shock resulting from rough handling of the soldering iron.

CARL B. SOHNS.

REFERENCES CITED

The following references are of record in the file of this patent:

UNITED STATES PATENTS

| Number | Name | Date |
|---|---|---|
| 2,101,445 | Moore | Dec. 7, 1937 |
| 2,159,869 | Thomas et al. | May 23, 1939 |
| 2,333,207 | Smith | Nov. 2, 1943 |
| 2,341,831 | Vanatta | Feb. 15, 1944 |

FOREIGN PATENTS

| Number | Country | Date |
|---|---|---|
| 24,933 | Great Britain | 1911 |